(No Model.)

C. H. GREEN.
THREAD CUTTER FOR SEWING MACHINES.

No. 253,474. Patented Feb. 7, 1882.

WITNESSES:
D. S. Williams
James F. Tobire.

INVENTOR,
Charles H. Green.
by his attorneys
Howson and Sons

UNITED STATES PATENT OFFICE.

CHARLES H. GREEN, OF PHILADELPHIA, PENNSYLVANIA, ASSIGNOR OF ONE-HALF TO JOSEPH R. CLAUSEN, OF SAME PLACE.

THREAD-CUTTER FOR SEWING-MACHINES.

SPECIFICATION forming part of Letters Patent No. 253,474, dated February 7, 1882.

Application filed September 2, 1881. (No model.)

*To all whom it may concern:*

Be it known that I, CHARLES H. GREEN, a citizen of the United States, residing at Philadelphia, Pennsylvania, have invented an Improvement in Thread-Cutters for Sewing-Machines, of which the following is a specification.

My invention consists of a thread-cutting device for sewing-machines, the said device being constructed in the peculiar manner fully described hereinafter, with the view of preventing the cutting of the operator's fingers by the blades.

Figure 1:
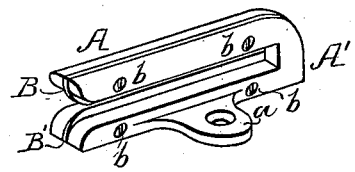
Figure 2:
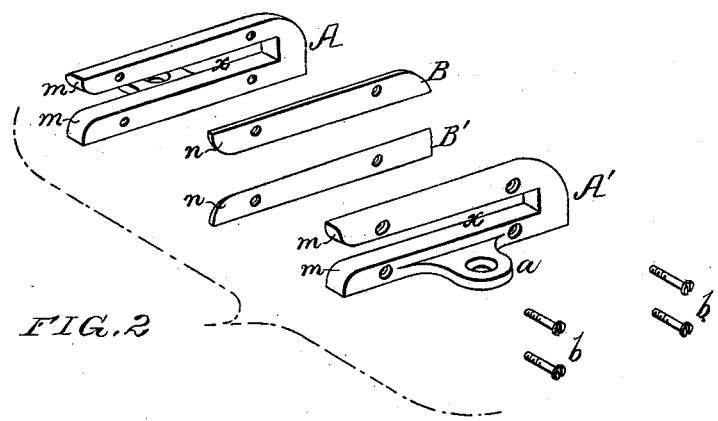
Figure 3:
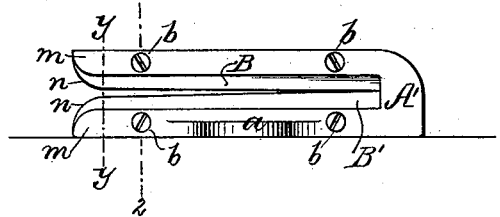
Figure 4:
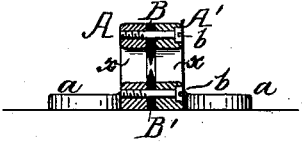

In the accompanying drawings, Figure 1 is a perspective view of my improved thread-cutting device for sewing-machines; Fig. 2, a perspective view of the detached parts of which the cutter is composed; Fig. 3, an enlarged side view of the cutter; and Fig. 4, a transverse section on the line 1 2, Fig. 3.

The cutting device consists of the two slotted bars A A', each having a lug, $a$, the two blades B B', and screws $b$ $b$, by which the above parts are secured together. The slot $x$ of each bar extends through one end of the same, and the entrance to the slot is made flaring by rounding the bar at $m$ $m$. When the several parts are connected together by the screws the upper blade, B, extends downward into the slot of the united bars, and the lower blade extends upward into the said slot, the cutting-edges of the said blades so converging that while they are at a short distance apart at the entrance to the slot they gradually approach each other, and are in actual contact at and near the end of the slot. The blades are rounded at their outer ends, $n$ $n$, and are blunt at these parts as far, or about as far, as the dotted line $y$ $y$.

The above-described instrument is attached in a suitable position by screws passing through the lugs $a$ to the bed of a sewing-machine for severing the thread, which can be promptly accomplished by pushing it into the space between the converging cutting-edges of the blades.

A cutting device for sewing-machines should be so constructed that, while it will serve the desired purpose, there is no chance of wounding the operator's hands, and this end is attained by confining the blades by and between bars of such a thickness that they act as shields for preventing a finger from penetrating through the contracted slot to the cutting-edges of the blades, and as these blades are blunt at their rounded ends $n$ $n$, no cutting of a finger can take place at the entrance to the slot.

The two bars A A' may be riveted together instead of being secured by screws; or a bar may be made in one piece and slotted or grooved for the reception of the two blades; but in all cases the bar or bars must present on both sides of the blades ribs or shields for preventing the access of fingers to the cutting-edges.

I claim as my invention—

The combination of the slotted bars A A', each having a lug, $a$, with the blades B B', secured to and between the bars, and the whole being otherwise constructed as set forth.

In testimony whereof I have signed my name to this specification in the presence of two subscribing witnesses.

CHARLES H. GREEN.

Witnesses:
JAMES F. TOBIN,
HARRY SMITH.